United States Patent [19]

Gerrard

[11] Patent Number: 4,894,075

[45] Date of Patent: Jan. 16, 1990

[54] FILTER FOR A FLUIDIZED BED POWDER COATING APPARATUS

[75] Inventor: Richard A. Gerrard, Brantford, Canada

[73] Assignee: Richard A. Gerrard, Brantford, Canada

[21] Appl. No.: 321,093

[22] Filed: Mar. 9, 1989

[51] Int. Cl.⁴ .................. B01D 46/00

[52] U.S. Cl. .................. 55/484; 55/525; 118/629; 118/308; 427/182

[58] Field of Search .................. 55/99, 479, 525, 484, 55/600, 603; 118/610, DIG. 5, 629, 308; 427/182

[56] References Cited

U.S. PATENT DOCUMENTS

| | | | |
|---|---|---|---|
| 1,573,656 | 2/1926 | Terhune | 55/484 |
| 2,021,853 | 11/1935 | Curley | 55/97 |
| 4,795,094 | 1/1989 | Correard | 118/308 |

FOREIGN PATENT DOCUMENTS

| | | | |
|---|---|---|---|
| 2068783 | 8/1981 | United Kingdom | 118/629 |

*Primary Examiner*—Bernard Nozick
*Attorney, Agent, or Firm*—Ridout & Maybee

[57] ABSTRACT

A filter for a fluidized bed powder coating apparatus is located within the fluidized hopper and fits about the end of a tubular conduit connecting the hopper to a spray gun. The filter is an enclosure having a plurality of holes through its walls which are sized to exclude particles from the conduit which would clog small orifices of the spray gun or associated venturi. The filter also acts to break up clumps of coating particles and to retain contaminant particles which may clog the venturi and gun. Preferably, the filter is made of expanded metal and is sized to sit in the fluidized bed of coating particles without unduly interfering with the flow of air into the hopper.

8 Claims, 2 Drawing Sheets

FILTER FOR A FLUIDIZED BED POWDER COATING APPARATUS

This invention is a filter for a fluidized bed powder coating apparatus.

Dry powders are preferred over solvent based paints for coating a wide variety of products such as metal furniture, appliances, lighting and other electrical fixtures, and automotive accessories, to name a few. Powder coatings are typically thermosetting, free flowing particles of 5 to 150 μm in size. These powders are generally organic polymers such as epoxides, polyesters or acrylics containing organic or inorganic pigments. Powder coating preparations often contain additives such as curing agents, catalysts or other performance modifying substances.

Dry powder coatings are applied to a surface using an electrostatic. spraying apparatus. Typically, such an apparatus has a fluidized hopper in which a quantity of the powder coating is maintained in a fluidized state by the flow of air into the hopper through a porous bottom diaphragm or plate. The fluidized hopper is connected by a hose to a spray gun which propels and electrically charges the powder. The electrostatically charged powder particles stick to the surface being coated, and the coating is then cured by baking.

The spraying of dry powder coatings results in a significant amount of powder which does not stick to the intended surface. Because the powder is dry, it is possible to retrieve spilled or oversprayed powder for recycling. Recycled powder, however, may be contaminated with dirt and other foreign matter, and the recycled powder often contains clumps of coating particles. These contaminants and clumps are undesirable because they promote clogging of the spraying apparatus, particularly at the spray gun, or because they detract from the quality of the coated surface. For most coating applications, the presence of small contaminant particles and small clumps of coating powder is not in itself a problem, but the presence of larger clumps of dirt or coating powder leads to clogging of the spray gun, or inferior surface coating.

The present invention presents a simple and inexpensive solution to this problem by providing a mesh-like enclosure for the end of the hose extending into the fluidized powder hopper. Preferably, the enclosure is in the form of a box having all walls perforated with a large number of small holes through which the coating particles must pass before they reach the hose. The holes are sized to promote the breaking up of clumps into particles small enough to pass through the narrow orifices of the spray gun and to prevent those larger particles which are not easily broken up from entering the hose at all. Depending on the particular application, the preferred hole size for the perforations of the walls of the filter falls in the range of from about 1 mm to about 5 mm.

Preferably, the filter of the invention should be of a size which fits within the fluidized particle bed hopper without unduly restricting the flow of air into it. The filter should have perforations sufficient in number and in size to allow the desired flow rate of powder from the hopper to the spray gun. These and other criteria are met by the present invention as will be described in detail below.

In summary, the invention provides a filter for a fluidized bed powder coating apparatus of the type having a fluidized hopper for maintaining coating particles in a fluidized state by the flow of air therethrough, and having a tubular conduit extending from the hopper through which powder particles may exit the hopper. The filter comprises an enclosure fitted about the end of the tubular conduit within the hopper, the enclosure having at least one wall defining a plurality of apertures each being from about 1 mm to about 5 mm in diameter, the coating particles being required to pass through the filter before entering the tubular conduit.

BRIEF DESCRIPTION OF THE DRAWINGS

Referring to FIG. 1, a filter 10 according to the invention comprises an enclosure for the end of a tubular conduit 12 extending from a fluidized bed powder coating hopper 14. The filter 10 may be of any shape, and the box shape shown in FIG. 1 is preferred for the application described herein.

Figure 1:
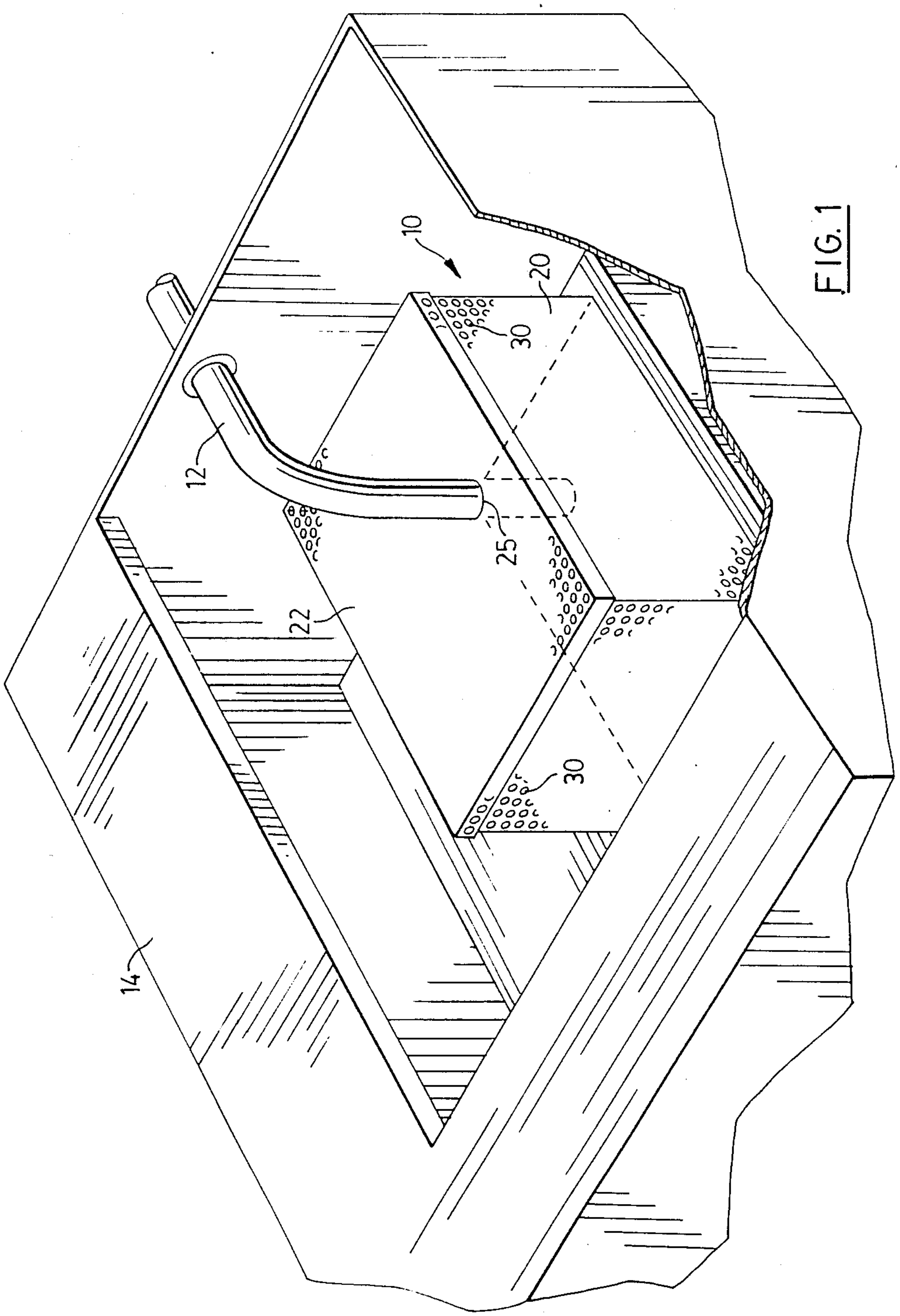
FIG. 1 is a perspective view of a preferred filter of the invention in a fluidized hopper.

The box shaped filter 10 has a bottom part 20 and a lid 22. Both the bottom part 20 and the lid 22 may be conveniently made from expanded metal sheet cut and folded to provide each shape. The filter 10 has a fitting 25 for receiving the end portion of the tubular conduit 12, the fitting 25 being, in the filter 10 shown in FIG. 1, an aperture formed through the lid 22 providing a frictional engagement of the conduit 12. The filter 10 may be constructed to receive more than one tubular conduit 12, so that the hopper 14 could be used in association with a plurality of spray guns. The filter 10 has a plurality of small apertures 30 through which coating particles may pass, and preferably these apertures 30 are provided in all the walls of the filter 10. Thus, preferably each of the six walls of the box bottom 20 and lid 22 form a mesh. This mesh construction is readily obtained by, as mentioned, making the filter 10 of expanded metal. It has been found that 18 gauge expanded metal is quite suitable for making a box filter 10 as shown in FIG. 1.

The filter 10 must have a sufficient number of apertures 30 of the appropriate size to provide the desired fragmentation of oversized particles and clumps as well as providing a barrier to the entry of oversized particles into the conduit 12. The size and number of the apertures 30 depends on the particular application parameters such as type of coating powder and the sizes of the spray gun's orifices as well as the rate of powder flow through the gun which is desired. It is preferred to provide the filter 10 with as many apertures 30 as is conveniently possible, hence the preference for making the filter 10 from expanded metal. There is, however, no reason why a perfectly suitable filter 10 might not be made of some solid sheet material through which sufficient apertures 30 are drilled, punched or otherwise formed. Likewise, it is not necessary that all walls of the filter 10 be provided with apertures 30 so long as the desired filtering and powder flow criteria are met.

The size of the apertures 30 is preferably from about 1 mm to about 5 mm in diameter. An acceptably uniform aperture size may be obtained from expanded metal, which is another reason why this material is preferred. For most applications a more preferred aperture 30 size is from about 2.5 mm to about 3.5 mm. It has been found that this latter more preferred aperture 30 size when provided by an expanded metal box structure as illustrated in FIG. 1 provides a very satisfactory performance in conjunction with a powder spray coating system used in an appliance manufacturing facility.

The overall size of the filter 10 also depends on the particular application. Clearly, the filter 10 must fit within the hopper 14, but beyond this requirement, the filter 10 should be small enough to sit in the bed of fluidized coating particles without so interfering with the flow of air entering the hopper 14, usually through its porous bottom, so that the operation of the hopper 14 is impeded. Also, the filter 10 potentially may displace powder volume so that the capacity of the hopper 14 would become disadvantageously reduced. Accordingly, it will be appreciated that the filter 10 should be sized as conveniently small as possible to do the desired job.

Figure 2:
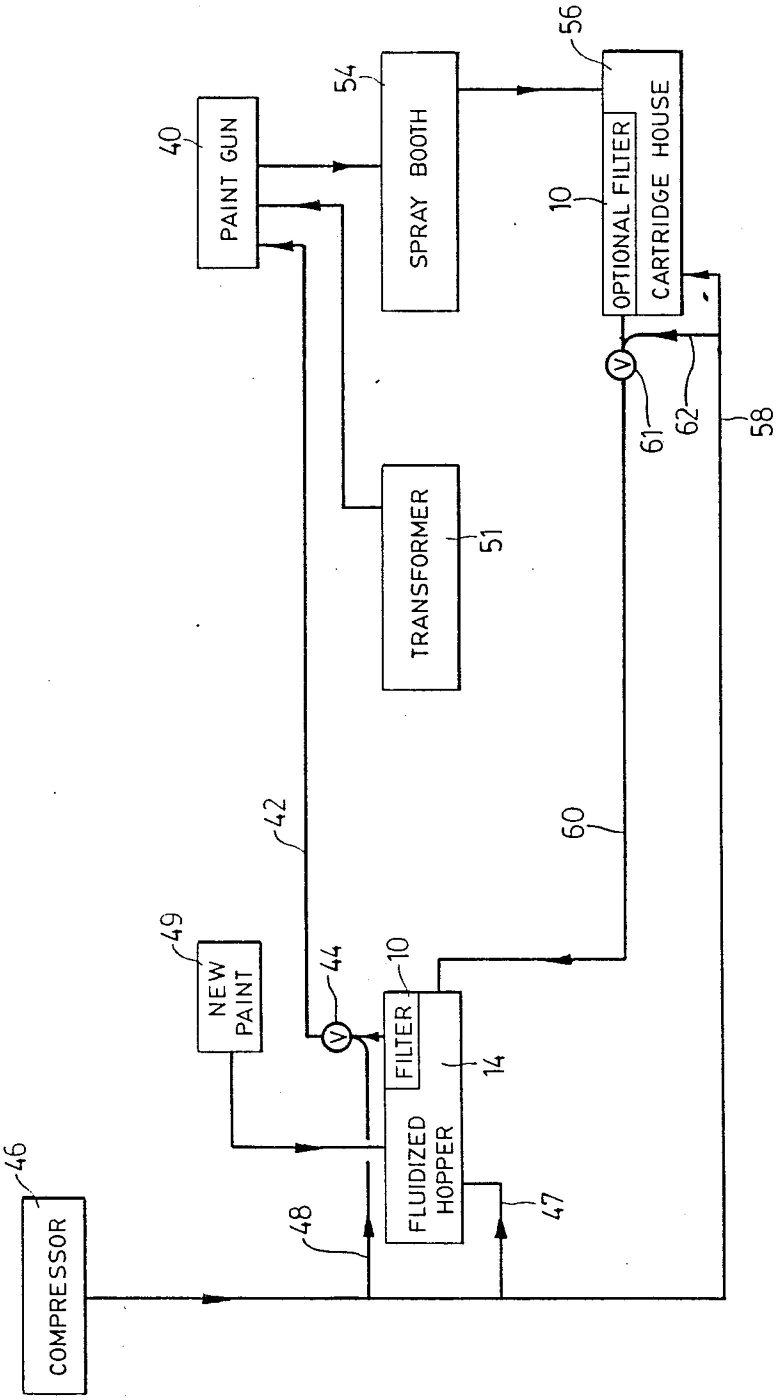
FIG. 2 is a flow diagram illustrating the use of the invention in a coating system.

The use of the filter 10 in a typical powder coating spraying system for a factory is shown in FIG. 2. A fluidized hopper 14 is connected to a spray gun 40 by a conduit 42 being enclosed about the end within the hopper 14 by a filter 10 of the invention. The conduit 42 may also contain a venturi 44 to assist in drawing coating particles from the hopper 14. Compressed air is fed from a compressor 46 into the hopper 14 and to the venturi 44 through conduits 47 and 48 respectively. New coating particles are fed into the hopper 14 from a bin 49.

Coating particles are electrostatically charged at the paint gun 40 by a transformer 51 just prior to being sprayed onto target surfaces located in a spray booth 54. Particles which do not stick to the target surfaces are recovered from the floor and walls of the spray booth 54 and recycled to the hopper 14. Often this recycling involved loading the recovered particles into a cartridge house fluidized hopper 56 which is in turn connected to the hopper 14. The cartridge house 56 is fluidized with compressed air provided from the compressor 46 via line 58. The coating particles in the cartridge house 56 are recycled to the hopper 14 via a conduit 60 having a venturi pump 61 operated by compressed air from line 62. Optionally, the end of the conduit 60 extending into the cartridge house 56 is provided with a filter 10

The overall system shown in FIG. 2 enables a high level of utilization of available powder coating with a low amount of wastage. The filters 10 serve to exclude large particles which would clog the small orifices of the venturis 44 and 61, and the paint gun 40 as well as to break up clumps of coating particles or contaminants. The filter 10 of the invention is inexpensive and easy to maintain, it being cleaned concurrently with the regular cleaning schedule of the hopper 14 or the cartridge house hopper 56.

While the foregoing description has related to a preferred embodiment of the invention, the description should not be read so as to restrict the scope of the invention as particularly set out in the following claims.

I claim:

1. A filter for a fluidized bed powder coating apparatus, said apparatus having a fluidized hopper in which powder coating particles are maintained in a fluidized state by the flow of air therethrough, and having a tubular conduit extending from the fluidized hopper through which powder coating particles may exit the hopper, the filter comprising:

an enclosure sized to fit within the hopper, the enclosure having a fitting for receiving an end portion of the tubular conduit and having a wall defining a plurality of apertures each being from about 1 mm to about 5 mm in diameter, the powder coating particles being required to pass through the filter before entering the tubular conduit.

2. A filter as claimed in claim 1, wherein the volume of the enclosure is small relative to the volume of the hopper.

3. A filter as claimed in claim 1, wherein the fitting comprises a portion of a wall of the enclosure defining an aperture providing a frictional engagement of the conduit.

4. A filter as claimed in claim 1, wherein the enclosure is made of expanded metal having a plurality of apertures.

5. A filter as claimed in claim 1, wherein the apertures in the wall are from about 2.5 mm to about 3.5 mm in diameter.

6. A filter as claimed in claim 1, wherein the enclosure is a two piece geometric structure having a bottom part and lid, the fitting being provided in the lid.

7. A filter as claimed in claim 4, wherein the bottom part and the lid are made of expanded metal having a plurality of apertures.

8. A filter as claimed in claim 4, wherein the bottom part and the lid are made of expanded metal having a plurality of apertures of from about 2.5 mm to about 3.5 mm in diameter.

* * * * *